United States Patent [19]
Smith et al.

[11] 4,325,174
[45] Apr. 20, 1982

[54] COMPOSITE DRIVE SHAFTS

[75] Inventors: Derek R. Smith; Gordon P. Worgan, both of Bristol, England

[73] Assignee: Union Carbide Corporation, Danbury, Conn.

[21] Appl. No.: 143,629

[22] Filed: Apr. 25, 1980

Related U.S. Application Data

[62] Division of Ser. No. 898,900, Apr. 21, 1978, Pat. No. 4,218,895.

[30] Foreign Application Priority Data

Apr. 28, 1977 [GB] United Kingdom ............... 17695/77
Apr. 4, 1978 [GB] United Kingdom ............... 17695/78

[51] Int. Cl.³ .................... F16D 3/26; B65H 81/00; F16C 1/02; B32B 1/08
[52] U.S. Cl. .................... 29/434; 64/1 S; 64/17 R; 64/27 NM; 156/172; 156/173
[58] Field of Search .................. 29/434; 156/172, 173; 64/1 R, 1 S, 18, 22, 21, 17 R, 27 NM

[56] References Cited

U.S. PATENT DOCUMENTS

| | | | |
|---|---|---|---|
| 899,534 | 9/1908 | Hoffman | 64/18 |
| 1,003,017 | 9/1911 | Warren | 64/17 R |
| 1,309,826 | 7/1919 | Unschel | 64/18 |
| 1,943,814 | 1/1934 | Cutting | 64/21 |
| 2,355,781 | 8/1944 | Cardinal | 29/434 |
| 2,553,020 | 5/1951 | Unschel | 64/21 |
| 2,648,207 | 8/1953 | Quinn | 64/17 R |
| 2,997,864 | 8/1961 | Rueb | 64/17 R |
| 3,030,784 | 4/1962 | Minik | 64/1 R |
| 3,434,195 | 3/1969 | Ritsema | 64/17 R |
| 3,447,232 | 6/1969 | Stillwagon | 29/434 |
| 3,461,688 | 7/1969 | Garfinkle | 64/18 |
| 3,553,978 | 1/1971 | Williams | 64/15 |
| 4,089,190 | 5/1978 | Worgan | 64/1 R |

*Primary Examiner*—Ira S. Lazarus
*Attorney, Agent, or Firm*—John R. Doherty

[57] ABSTRACT

A composite drive shaft having a pair of aligned, diametrically opposed bores in which a cross-shaped coupling forming part of a universal joint is pivotally connected. This construction materially reduces the weight of drive shaft/universal joint combinations by eliminating the steel Hookes joint yokes which heretofore have been bonded into the shaft.

5 Claims, 6 Drawing Figures

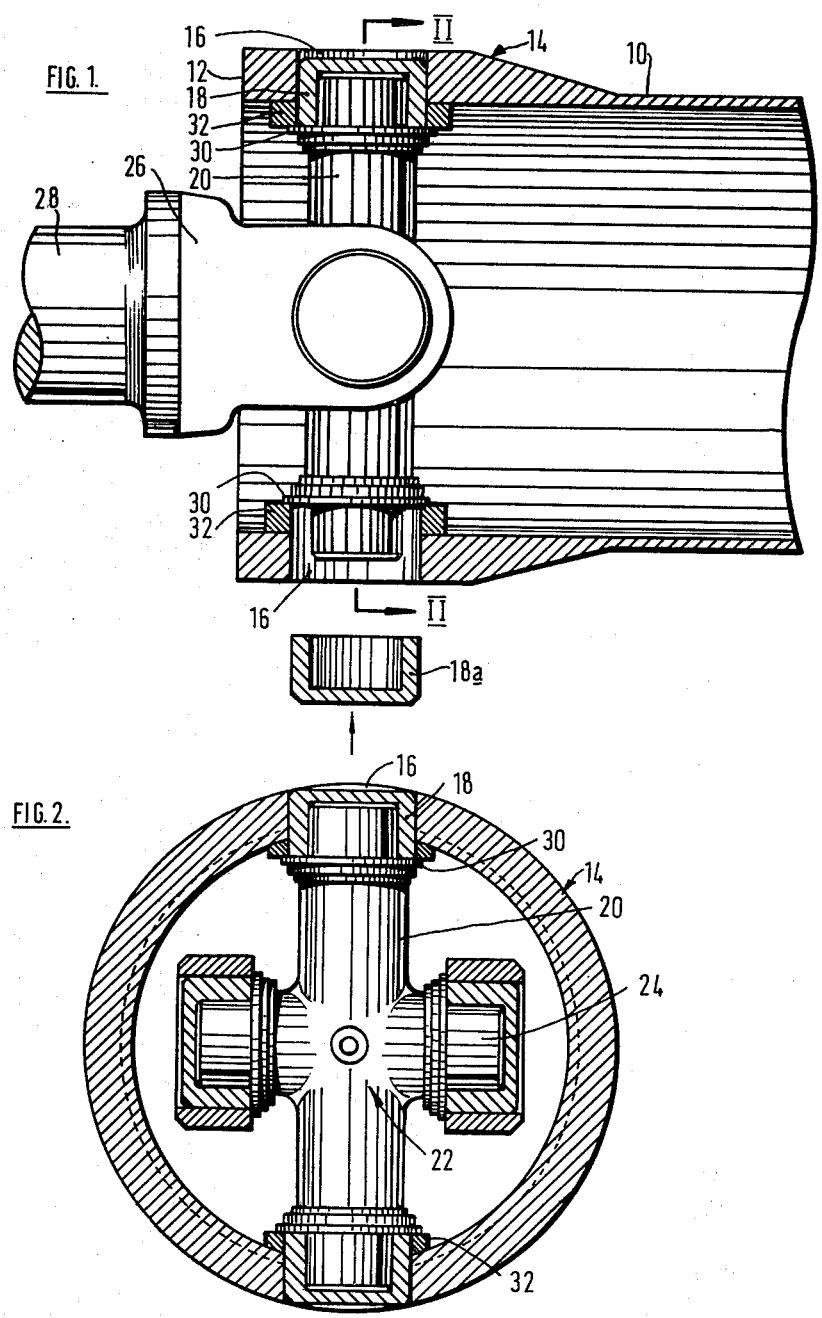

COMPOSITE DRIVE SHAFTS

This application is a division of our prior U.S. application Ser. No. 898,900, filed Apr. 21, 1978, now U.S. Pat. No. 4,218,895.

This invention relates to a drive shaft combined with a universal joint of the Hookes type at at least one end thereof. More specifically, the invention relates to a drive shaft of tubular form and comprising fibre reinforcement set in a rigid matrix of a synthetic resinous material. A shaft made of such reinforced material will hereinafter be referred to as a "composite" shaft. For example, the fibre reinforcement may comprise carbon fibres and/or glass fibres, and may be set in a rigid matrix of a cured epoxy resin. However, other fibres and other resins may be used.

There have been a number of proposals to use such shafts as drive or propeller shafts in motor vehicles between change-speed gearing and a driven axle. Conventional drive shafts are made of steel tube and have welded to their ends, or at least to one end, a Hookes joint yoke. It has been proposed to have composite shafts of tubular form into the ends of which have been inserted steel Hookes joint yokes which have been bonded into the shaft. It has also been proposed to hold two such steel yokes in spaced aligned relation by a foamed plastic core and then to form the composite shaft about the yokes and the core so that the yokes are "wound in" being surrounded by the impregnated fibres as the latter are wound on the core. The or each inserted yoke receives the end portions of one limb of a cross-shaped coupling, the end portions of the other limb thereof being received in a second yoke, the yoke and the cross forming the Hookes joint.

There is at present in the motor industry a search for weight reduction and while composite drive shafts with steel yokes are lighter than equivalent conventional drive shafts we have found that there is further scope for saving weight in such a shaft/joint combination and it is an object of the invention to provide a light-weight but strong drive shaft. Such a shaft is intended for use in the drive line of a motor vehicle but may be used in other applications.

According to one aspect of the invention we provide the combination of (1) a tubular shaft comprising reinforcing fibres set in a rigid matrix of synthetic resinous material, the shaft having adjacent to one end thereof a pair of aligned, diametrically opposed bores, (2) two journal bearings, one set in each bore and (3) a cross-shaped coupling having the end portions of one limb thereof supported for rotation in said journal bearings, the other limb of the coupling being supported in a yoke.

One end of the shaft may carry a cross-shaped coupling as described or both ends may be similarly constructed.

By this construction we have materially reduced the weight of the drive shaft/joint combination since we have dispensed with the steel yoke previously inserted into the shaft bore and have replaced it by the two journal bearings and a short extension of the shaft which together weigh considerably less than the previously used steel yoke which contained the journal bearings.

Preferably, said end portion of the shaft, or each end portion if each carries a cross-shaped coupling, is of greater thickness in a radial direction than the main portion of the shaft. The greater thickness of the or each end portion serves more effectively to resist torque applied to the shaft by the coupling via the journal bearings when the combination is in use. The main portion of the shaft usually has a thickness between 1/15 and ½ of that of the thickened end portions, most usually between 1/6 and ¼ of that of the thickened end portions.

Where the or each end portion is thickened as suggested it may comprise a preformed ring made of a composite material, i.e., reinforcing fibres set in a rigid matrix of synthetic resinous material, and which is wound in during manufacture of the shaft, i.e., is surrounded by another layer of reinforcing fibres set in a rigid matrix of synthetic resin and which is in one piece with the remainder of the shaft or may comprise simply a portion of the shaft which has been built up to a greater thickness than the remainder thereof.

According to another aspect of the invention we provide a method of making the combination of the shaft and a universal joint of the Hookes type comprising: winding on a mandrel a plurality of layers of reinforcing fibres; impregnating the fibres with an uncured resin either before, after or simultaneously with said winding; curing the resin to a rigid structure; removing the resulting tubular shaft from the mandrel; forming adjacent to one end thereof a pair of aligned, diametrically opposed, bores; and inserting into each of said bores a journal bearing to support the opposite end portions of one limb of a cross-shaped coupling, the other limb of which is received in a yoke member.

Where one or each end portion of the shaft is to be thickened as described above, the method may comprise placing on the mandrel, before winding on the fibres to form the shaft, a ring of composite material as defined and then winding on said fibres so that they overlap the ring and form the shaft. After the material has been cured and the shaft removed from the mandrel, then the bores are formed through the shaft and the ring.

Alternatively, instead of having a preformed end portion, the winding may be carried out so that the or each end portion is of greater thickness in a radial direction than the main portion of the shaft.

The invention will now be described by way of example with reference to the accompanying drawings, of which:

FIG. 1 is a fragmentary longitudinal section through one end of a drive shaft according to the invention, showing one stage in assembly thereof;

FIG. 2 is a section taken along the line II—II of FIG. 1;

FIG. 4 is a diagramatic view in side elevation of apparatus for forming a composite shaft in accordance with;

Figure 3:
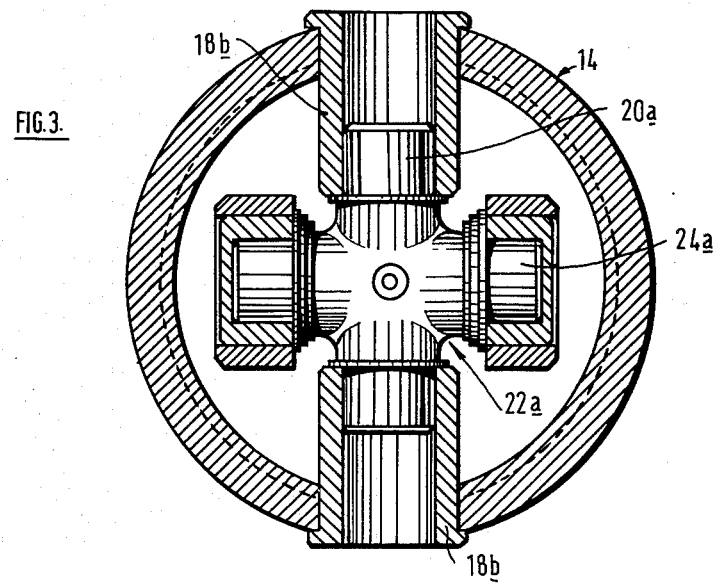
FIG. 3 is similar to FIG. 2 but shows the composite drive shaft in association with a different kind of universal joint.

Referring firstly to FIG. 1, there is shown one end of a composite shaft 14 which has a tubular portion 10 and a thickened end portion 12. A pair of aligned bores 16 are provided in the end portion 12, and receive a pair of bearing cups 18 which in turn pivotably mount in, for example, needle roller bearings, end portions of one limb 20 of a cross-shaped coupling 22. The other limb 24 of the coupling is, as seen in FIG. 2, shorter than the limb 20 and the end portions thereof are pivotably secured to the limbs of a yoke 26 carried at one end of a rotatable member 28 which is to be driven by the drive shaft 14.

The assembly thus constitutes a Hookes universal joint, with one yoke constituted by the thickened end portion 12 of the drive shaft rather than by a separate yoke component secured thereto, the thickened portion 12 constituting a torsional shear distributing member.

In the construction shown in FIGS. 1 and 2, the respective limbs 24, 20 of the cross-shaped coupling 22 are of unequal length. In an alternative arrangement, shown in FIG. 3, elongate bearing cups 18b are provided and the limbs 20a, 24a of the coupling are of equal length.

The composite shaft is manufactured by applying reinforcing fibres to a mandrel and subjecting a curable synthetic resin material which impregnates the fibres to treatment to cause the resin to form a rigid matrix incorporating the reinforcing fibres. Preferably, the synthetic resin material employed is a thermosetting resin, most preferably an epoxy resin.

Figure 4:
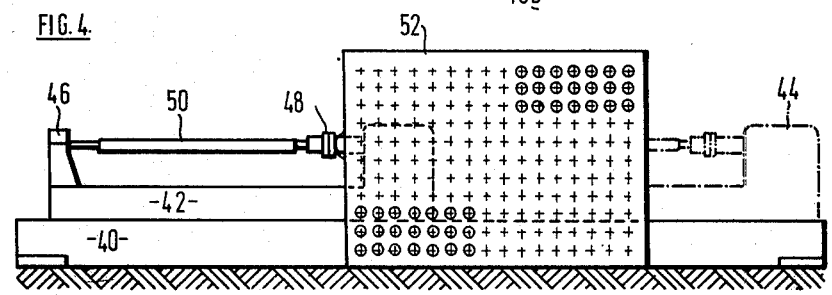
Figure 5:
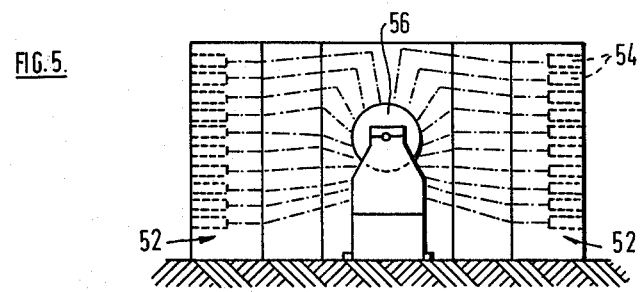
FIG. 5 is an end view of the apparatus of FIG. 4.

Referring now to FIGS. 4 and 5, there is illustrated apparatus which comprises a base 40 carrying for traversing movement longitudinally of the base an assembly of a bed 42, head stock 44 and tail stock 46. The head stock carries a chuck 48 and a motor for rotating the chuck, providing for holding and rotation of a mandrel 50 supported between the chuck and tail stock 46.

Mounted in fixed positions on opposirte sides of the base 40 are provided a pair of assemblies 52 which provide for storage of fibres to be wound onto the mandrel on a plurality of individual holders 54, each of which carries a tow or thread of fibres. It will be appreciated that such a tow will consist of a plurality of individual fibres. Each holder may comprise a reel, bobbin, or the like. From the holders 54 a selected number of tows of fibre are led, as shown diagrammatically in FIG. 5, to a winding head 56 which surrounds the path of the mandrel when the bed 42 is traversed along the base 40 and provides for application of the tows of fibre to the mandrel. If, with the bed 42 of the apparatus at the left hand end of its range of movement with reference to FIG. 4, the tows of fibre are clamped at the chuck 48 and the mandrel of the machine rotated and moved to the right hand end of its range of movement, as indicated in chain dotted lines in FIG. 4, this will result in helical winding of the tows of fibre about the mandrel in a pattern dependent on the relative rates of rotation of the mandrel and traversing movement of the machine bed.

The winding head 56 also contains means for applying a setable resin composition to the tows of fibre immediately prior to their application to the mandrel. Such means may be of generally conventional form. Alternatively, or in addition, impregnation with the resin may be carried out after the application of fibres to the mandrel.

In order to manufacture a drive shaft according to the invention, a mandrel of appropriate diameter according to the desired internal diameter of the shaft would be fitted to the apparatus and coated with a release agent. Fibres would then be applied to the mandrel by use of the apparatus as above described, such fibres being impregnated with the settable resin material prior to their application to the mandrel. A typical shaft construction may include layers of fibres which extend helically at approximately 90 deg. to the longitudinal axis of the shaft, i.e., one or more hoop windings, and fibres which extend at a lesser angle, e.g. 45 deg., to the axis. Fibres may also be applied extending parallel to the axis of the shaft. One or both end portions of the shaft thus formed may be thicker than the remainder of the shaft, and this may be achieved either by applying further windings to the mandrel in such end portions during or after formation of the main part of the shaft, or a pre-formed ring of composite material may be placed on the mandrel prior to the winding of fibres thereon as above described.

When the shaft has been formed on the mandrel with appropriate thickening of one or both end portions, if desired the mandrel and shaft would be removed from the apparatus and subjected to treatment, e.g. heating, to cause the resin to cure and provide a rigid matrix in which the reinforcing fibres are set. The shaft would then be removed from the mandrel, and the opposed pairs of bores 16 drilled in one or both ends of the shaft, ready to receive the bearing cups 18 as described above with reference to FIGS. 1 to 3.

The universal joints are then assembled by, initially, assembling the yoke 26 with the end portions of one limb 24 of the cross-shaped coupling 22. This assembly would then be disposed inside the end portion of the shaft so that the end portions of the other limb 20 of the cross-shaped coupling are in alignment with the bores 16 in the shaft, and the bearing cups 18 would then be fitted into the bores 16 from outside the shaft so that the cross-shaped coupling is pivotably supported in the shaft. In the lower part of FIG. 1, a bearing cup is shown at 18a in its position prior to being fitted into its bore in the shaft.

The bearing cups 18 may be secured in position in the shaft in various ways. For example, the outer circumferential surfaces of the bearing cups may be provided with grooves in which circlips 30 can be located, such circlips pressing against packing pieces 32 which may be bonded in position on the radially inner surface of the drive shaft before the bores 16 are drilled therethrough. With such a method of fitting the bearing cups, the dimensions of the bores 16 would be selected so that the bearing cups would be a relatively tight press fit therein. Alternatively, the bearing cups may be adhesively secured in position in the bores 16. This may be done by applying adhesive to one or both of the outer surface of each bearing cup and the inner surface of each bore prior to insertion of the bearing cup. With this method, the use of mechanical fastening devices such as circlips or the like would not be necessary, as shown in FIG. 3 of the drawings.

Figure 6:
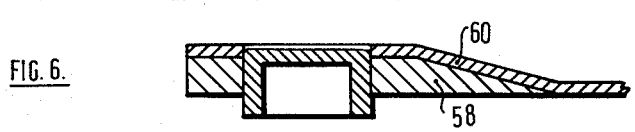
FIG. 6 shows a possible modification to the shaft.

In FIG. 6 is shown diagrammatically the end portion of a shaft in which thickening thereof has been achieved by placing a preformed ring of composite material on the mandrel prior to winding of the shaft forming fibres thereon. The pre-formed ring is indicated at 58, and the windings placed thereon at 60. In such a construction, the main portion of the shaft may have a wall thickness in the range 1/15 to $\frac{1}{2}$ of the wall thickness of the thickened end portion. In such a construction, the use of packing pieces 32 (FIG. 1) in the interior of the shaft to assist in supporting the bearing cups may not prove necessary because the wall thickness in the end portion of the shaft would be sufficient to provide adequate support for the bearing cups.

In one example of a shaft which has been manufactured in accordance with the present invention, a mandrel of 3 inches diameter was wound successively with the following applications of fibre:

1. A single pass along the length of the mandrel with 10 tows of "Thornel" 300 (trade mark of Union Carbide Corporation) carbon fibre at an angle of winding of substantially 90 deg. to the longitudinal axis of the shaft. This achieves complete coverage of the mandrel by one thickness of the carbon fibre thread.

2. Six passes along the length of the mandrel of 180 tows of "Thornel" 300 carbon fibre at a winding angle of 22½ deg. to the longitudinal axis of the shaft. Each of these passes also achieves complete coverage of the mandrel. The fibres of each successive pass cross the fibres of each previous pass at an angle of 45 deg.

3. A further hoop winding pass of 10 tows of the carbon fibre at a winding angle of substantially 90 deg.

These windings build up to an outside diameter of the composite shaft of about 3.15". Approximately 6 inches of each end of the shaft was then built up by about 0.2" wall thickness by winding glass fibre fabric circumferentially about the shaft.

These fibres were impregnated during their application to the mandrel by an epoxy resin and hardener mixture supplied by Shell Chemical Co. as type 828/142 in the proportion of 100 parts by weight of resin to 27 parts by weight of hardener. The assembled shaft was then subjected to heating for 60 minutes at 180 deg. C. to cure the resin-hardener mixture and set the fibres in the resin matrix. The thickened end portions of the shaft were drilled to form bores of 1" diameter therein, and bearing cups made of "Tufnol" (registered trade mark) were press fitted therein.

In a further example of manufacture of a shaft according to the invention, a mandrel of 2.54" diameter was wound with six passes of 180 tows of "Thornel" 300 carbon fibre at a winding angle of 22½ deg. to the longitudinal axis of the shaft. The fibres of each successive wrap crossed the fibres of each previous wrap at an angle of 45 deg. This was followed by two passes at a winding angle of substantially 90 deg. of 5 tows of "Thornel" 300 carbon fibre. The resin used and the curing treatment were as described above for the first example. The windings built up to an outside diameter of the composite shaft of about 2.62". The shaft thus prepared was drilled with bores of 0.75" diameter, and a pin fitted in such bores to extend across the diameter of the shaft. The assembly thus obtained withstood a torque of 200 ft. lbs.

In a further demonstration, a composite drive shaft of 6" internal diameter, 6.08" outer diameter, and an end wall thickness of 1", withstood 17,500 ft. lbs. torque without failure.

These results indicate that such composite drive shafts could carry the loads imposed thereupon if located in the mechanical power transmission of a conventional vehicle.

What is claimed is:

1. A method of making a combination of a shaft and a universal joint of the Hookes type comprising: winding on a mandrel a plurality of layers of reinforcing fibres; impregnating the fibres with an uncured resin either before, after or simultaneously with the winding; curing the resin to a rigid structure; removing the resulting tubular shaft from the mandrel; forming adjacent to one end thereof a pair of aligned, diametrically opposed bores; and inserting into each of said bores a journal bearing and subsequently or simultaneously supporting in said bearings the opposite end portions of one limb of a cross-shaped coupling, the other limb of which is received in a yoke member.

2. A method according to claim 1 including placing on the mandrel, before winding on the fibres, a ring of composite material and then winding on said fibres so that they overlap the ring and thereby form an end portion of greater thickness than the main portion of the shaft and, after removing the shaft from the mandrel, forming bores in the shaft and the ring.

3. A method according to claim 1 comprising forming the end portion of the shaft so that it is of greater thickness than the main portion of the shaft by winding onto the mandrel more layers of fibres at said end portion than in said main portion.

4. A method according to claim 1 comprising applying mechanical fastening means to each of said journal bearings, which fastening means abuts the inner surface of the shaft to retain the bearing in position in its bore.

5. A method according to claim 1 comprising adhesively securing packing pieces in position in the shaft prior to forming said bores therein, said bores extending through said packing pieces.

* * * * *

UNITED STATES PATENT AND TRADEMARK OFFICE
CERTIFICATE OF CORRECTION

PATENT NO. : 4,325,174
DATED : April 20, 1982
INVENTOR(S) : Derek R. Smith; Gordon P. Worgan It is certified that error appears in the above—identified patent and that said Letters Patent is hereby corrected as shown below:

Column 2, line 55, "diagramatic" should be "diagrammatic".

Column 2, line 57, after "with" the words "the invention" should be inserted.

Column 3, line 33, "pluraity" should be "plurality".

Column 4, line 11, a comma (,) should be inserted after "desired".

Signed and Sealed this

Seventh Day of December 1982

[SEAL]

Attest:

GERALD J. MOSSINGHOFF

Attesting Officer     Commissioner of Patents and Trademarks